(12) United States Patent
Hammad

(10) Patent No.: US 8,983,438 B2
(45) Date of Patent: Mar. 17, 2015

(54) SYSTEM AND METHOD FOR ENABLING A MOBILE COMMUNICATION DEVICE TO OPERATE AS A FINANCIAL PRESENTATION DEVICE

(75) Inventor: Ayman Hammad, Pleasanton, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 1082 days.

(21) Appl. No.: 12/606,685

(22) Filed: Oct. 27, 2009

(65) Prior Publication Data

US 2011/0098023 A1 Apr. 28, 2011

(51) Int. Cl.
| | |
|---|---|
| H04M 3/42 | (2006.01) |
| G06Q 20/32 | (2012.01) |
| G06Q 20/40 | (2012.01) |
| H04W 12/04 | (2009.01) |
| H04W 12/08 | (2009.01) |
| H04L 29/08 | (2006.01) |

(52) U.S. Cl.
CPC ............ *G06Q 20/3223* (2013.01); *G06Q 20/32* (2013.01); *G06Q 20/401* (2013.01); *H04W 12/04* (2013.01); *H04W 12/08* (2013.01); *H04L 67/04* (2013.01)
USPC .............................. 455/414.1; 705/17; 705/77

(58) Field of Classification Search
CPC ............... H04M 2203/105; H04M 2215/0156; H04M 2215/016
USPC .................. 455/406, 410, 411, 414, 418–420, 455/556.1, 556.2, 550.1, 551, 552; 705/16, 705/18, 64, 67, 72
See application file for complete search history.

(56) References Cited

U.S. PATENT DOCUMENTS

| | | | | |
|---|---|---|---|---|
| 7,752,292 | B1* | 7/2010 | Katzer | 709/222 |
| 2005/0043997 | A1 | 2/2005 | Sahota et al. | |
| 2005/0101295 | A1* | 5/2005 | Rupp et al. | 455/411 |
| 2007/0022058 | A1* | 1/2007 | Labrou et al. | 705/67 |
| 2007/0280483 | A1* | 12/2007 | Fu et al. | 380/286 |
| 2008/0126145 | A1* | 5/2008 | Rackley, III et al. | 705/7 |
| 2008/0208681 | A1 | 8/2008 | Hammad et al. | |
| 2008/0248815 | A1* | 10/2008 | Busch | 455/456.5 |

* cited by examiner

*Primary Examiner* — Marcos Batista
(74) *Attorney, Agent, or Firm* — Kilpatrick Townsend & Stockton LLP

(57) ABSTRACT

A provisioning system for enabling a mobile communication device to operate as a financial presentation device (FPD) which is presentable to providers of goods or service is provided. The provisioning system relies on a transaction processing system that normally routes authorization requests from merchants to issuers of FPDs for purposes of authorizing FPD transactions. The transaction processing system already stores security keys of all issuers in order to validate transaction data being sent from the merchants. The provisioning system monitors authorization requests being routed through the transaction processing system and retrieves an authorization request of a financial transaction that was initiated with a particular FPD. The provisioning system then transmits the FPD data contained in the retrieved authorization request and the security key stored in the transaction processing system to a secure memory element of the mobile communication device so as to enable the mobile communication device to operate as a FPD.

24 Claims, 3 Drawing Sheets

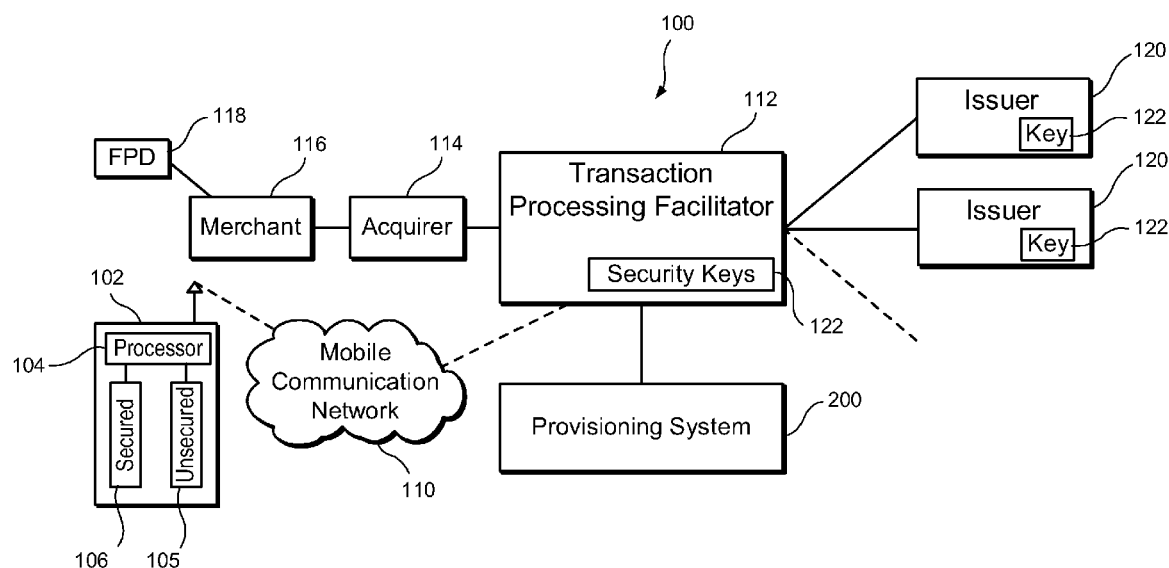
F I G. 1

SYSTEM AND METHOD FOR ENABLING A MOBILE COMMUNICATION DEVICE TO OPERATE AS A FINANCIAL PRESENTATION DEVICE

FIELD OF THE INVENTION

The present invention relates to data processing, and more particularly relates to a system and method for enabling a mobile communication device to operate as a financial presentation device.

BACKGROUND OF THE INVENTION

A financial presentation device (FPD) is a payment device that can be presented to sellers of goods or services for payment, and includes, but are not limited to, credit cards, debit cards, prepaid cards, electronic benefit cards, charge cards, virtual cards, smart cards, key chain devices, personal digital assistants, cell phones, stored value devices and the like. Conventional FPDs such as credit cards and debit cards provide convenience to customers and facilitate financial and commercial transactions. Such conventional "plastic" FPDs require the holder to carry the card and to swipe or insert the card into a card reader at the point of sale. With the widespread use of mobile communication devices such as cell phones and personal digital assistants, there has been a proposal to configure or "provision" mobile communication devices with card holder data and to adapt them for use as an FPD in lieu of conventional plastic FPDs. This would eliminate the need to carry a separate FPD, and allow financial transactions at the point of sale to be performed in a wireless (contactless) mode, for example, through near-field communications (NFC).

In the case of conventional FPDs, issuers have control over the manufacture of the FPDs, which may be done in a single batch process. In the case of mobile communication devices, however, issuers have no control over those devices as they belong to the customers themselves. As such, issuers have no convenient way to configure all of the mobile communication devices of their customers (FPD holders) to operate as FPDs since it would be burdensome for the issuers to provision the devices of all holders with required software, data and security features. To deal with this problem, issuers can turn to a third-party ('OTA (over-the-air) providers') to provision the mobile communication devices of their FPD holders with the software, data, and security features needed to enable the mobile communication devices as FPDs. Typically, the provisioning process requires the issuer to securely transfer to the OTA provider private FPD holder data and security keys necessary to provision the mobile device. Security keys in the context of this application are those that are used to validate card or account verification data that originates from the card or mobile communication device during a financial transaction. For example, a security key can be used to generate a dynamic card verification value which can be used to validate the card transaction.

The fact that the OTA provider has continued access to this sensitive information increases the opportunity for security breaches and the potential for counterfeit and fraudulent transactions. If it were possible to eliminate the transfer and storage of this sensitive information, the payment infrastructure would be more secure.

Moreover, the OTA provider would need to obtain permission from each mobile communication service provider to transmit data for each issuer. This is because the service providers control access to the secure chip inside the mobile communication devices. Since there are over 10,000 issuers in the U.S. alone and over 50 communication service providers, it would be a logistical challenge to negotiate the permission for each issuer from each communication service provider.

It would therefore be desirable to provide a system and method for enable a mobile communication device to operate as an FPD without releasing sensitive FPD data and security keys to a third-party OTA provider and without having to negotiate the permission for access to the mobile communication devices for all the issuers.

SUMMARY OF THE DISCLOSURE

In a first aspect, the present invention provides a system for enabling a mobile communication device to operate as a financial presentation device (FPD) which is presentable to providers of goods or service, where the mobile communication device and the FPD belong to a holder. The system comprises a memory storing a security key corresponding to an issuer of the FPD, a processor coupled to the memory, and a provisioning module executable by the processor. The provisioning module monitors incoming authorization requests for financial transactions to retrieve an authorization request of a financial transaction that was initiated with the FPD, stores FPD data contained in the retrieved authorization request in the memory and transmits via a wireless communication network the stored security key and the stored FPD data to the mobile communication device for storage into the secure memory element so as to enable the mobile communication device to operate as a FPD.

According to another aspect, the present invention provides a method for enabling a mobile communication device having a secure memory element to operate as a financial presentation device (FPD) which is presentable to providers of goods or services. The method includes monitoring, using a processor, incoming authorization requests for financial transactions being routed by a transaction processing system between merchants and issuers of FPDs for purposes of authorizing FPD transactions wherein the transaction processing system stores security keys of FPD issuers; retrieving an authorization request of a financial transaction that was initiated with a particular FPD; storing FPD data contained in the retrieved authorization request in a memory coupled to the processor; and transmitting via a wireless communication network the stored security key and the stored FPD data to the mobile communication device for storage into the secure memory element so as to enable the mobile communication device to operate as a FPD.

BRIEF DESCRIPTION OF THE DRAWINGS

FIG. 1 is a functional block diagram of a system for enabling a mobile communication device as an FPD according to an embodiment of the present invention.

DETAILED DESCRIPTION OF THE INVENTION

Figure 2:
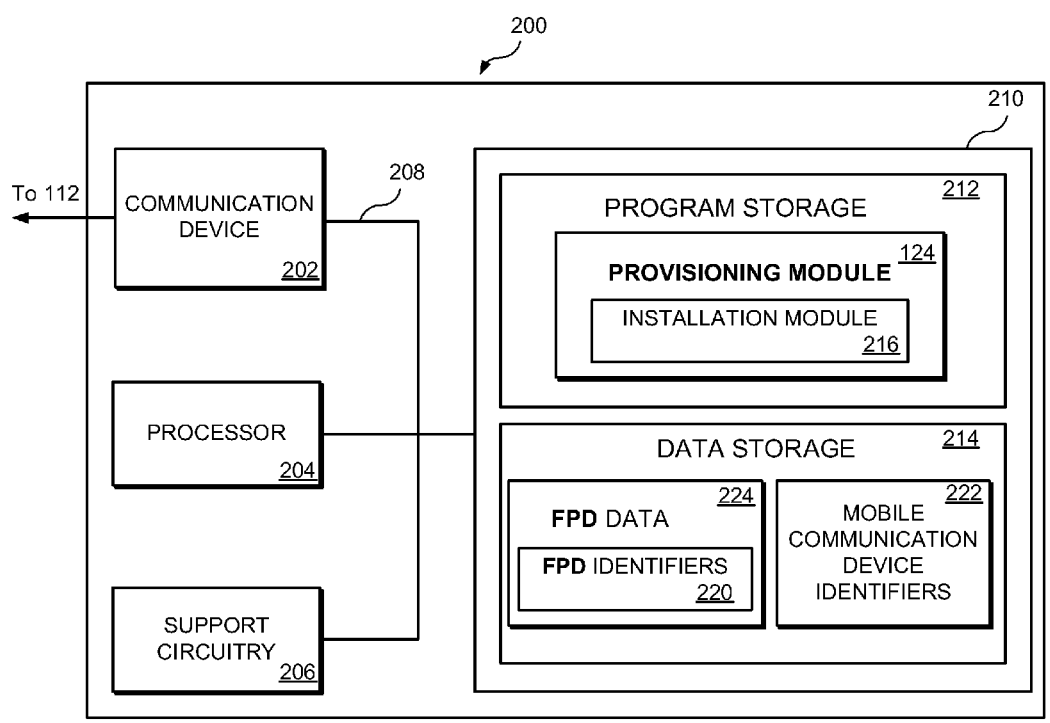
FIG. 2 is a block diagram of a computer system including program code for a provisioning module according to an embodiment of the present invention.

A transaction processing facilitator (transaction processing system) is a network such as VISA® and others that acts as a switch between acquirers and issuers for routing messages therebetween for purposes of authorization, clearing and/or settlement of financial transactions.

In a typical card transaction, a card 118 is presented to a merchant 116 to purchase an item from the merchant. The card 118 is swiped through a merchant's POS 116 which retrieves cardholder data such as name, card number and CVV in a well known manner. A transaction authorization request containing the retrieved data is then sent to the merchant's acquirer 114 which is typically a bank. The acquirer 114 forwards authorization request to the processing facilitator 112. From the cardholder data contained in the authorization request message, the processing facilitator 112 determines the issuer of the card 118 and routes the message to the corresponding issuer 120 of the card 118. The issuer 120 determines whether to authorize or decline the transaction and sends a response message to the processing facilitator 112. The response message is then forwarded to the merchant 116 via the acquirer 114.

During the transaction authorization process, the transaction processing facilitators, such as Visanet®, store security keys provided by issuers in the regular course of business in order to validate authorization communications pertaining to card transactions. Although the transaction processing facilitators normally do not store cardholder data such as the account number and holder name indefinitely, the cardholder data is held at least long enough to complete authorization of a card transaction. Accordingly, as the transaction processing facilitator is in possession of the security keys and the cardholder data, it can perform the functions of an OTA provider to enable cellular telephones to operate as a payment device, without in any way compromising security since they hold the security keys in any event and are known to implement robust security measures.

The present invention takes advantage of these facts to provision cellular telephones to act as payment devices, e.g., FPD. Briefly, when a cardholder requests to have his cell phone act as a payment device, the transaction processing facilitator receives notice of that request along with the cellular telephone number. The cardholder is advised that the telephone will be provisioned upon the next transaction using the cardholder's traditional card. Subsequently, the processing facilitator monitors transaction authorization requests from the traditional card. When a transaction authorization for that particular card is received, the transaction processing facilitator has all of the information to initiate the provisioning of the cellular telephone. The processing facilitator transmits the respective issuer's security key and the just received cardholder data contained in the authorization request message to the corresponding cellular telephone, enabling the telephone to act as a payment device.

Since the transaction processing facilitator represents all of the issuers, it can negotiate the permissions to access the smart chip on the cellular telephones with all of the cellular service providers as a single entity, which makes negotiation much simpler.

FIG. 1 is a functional block diagram of a system 100 for enabling a mobile communication device as an FPD according to an embodiment of the present invention. As shown in FIG. 1, system 100 includes a mobile communication device 102 having wireless communication capabilities. The mobile communication device may be a cell phone, a PDA, laptop computer, pager, etc. In a typical embodiment, mobile communication device 102 is a cell phone, although, as noted, it is not so limited. Mobile communication device 102 includes a processor 104 and unsecured memory 105, which together perform telephony, near-field communication and other functions. The mobile communication device 102 further includes a secure memory element 106 that is coupled to the processor. Secure memory element 106 may be in the form of a SIM chip, embedded chip, flash memory or other suitable non-volatile memory device that may be used to store data securely.

Mobile communication device 104 is capable of communicating wirelessly over mobile communication network 110, which may be any wireless network that supports cellular telephone and data communication. A transaction processing facilitator 112, which in one embodiment comprises a payment processing network, such as Visanet, is coupled to the mobile communication network through a wired or wireless link. As discussed earlier, the transaction processing facilitator 112 processes FTD transaction (e.g., card transaction) authorization requests received over the private financial services network from acquirers 114. Acquirers 114 in turn receive FTD authorization requests that are generated at a merchant point of sale 116 upon presentation of the FTD 118 by a customer. The authorization requests are passed by transaction processing facilitator 112 to issuers 120 of the FTDs which determine FTD authorization. Issuers also create security keys 122 and provide the security keys 122 to the transaction processing facilitator 112, which is a trusted repository, where the security keys are stored in a memory and are used to validate authorization and used for other communications over the financial services network, possibly with the use of encryption/decryption. As discussed further below, transaction processing facilitator 112 also implements a provisioning module 124 for enabling mobile communication device as an FTD according to the present invention.

For purposes of this application, the terms "code", "program", "application", "software code", "software module", "module" and "software program" are used interchangeably to mean software instructions that are executable by a processor or. The module can also be a hardware circuit.

FIG. 2 is a block diagram of a computer system 200 including program code for a provisioning module 124 according to an embodiment of the present invention. In some embodiments, the computer system 200 may be implemented by transaction processing facilitator 112. Computer system 200 includes a communication device 202 for sending/receiving data communications, a processor 204, such as a central processing unit (CPU) and support circuitry 206. The processor 202, communication device 204 and support circuitry 206 are commonly connected to a bus 208 which also connects to a memory 210. In one embodiment, the communication device 202 is connected to the transaction processing facilitator 112 computer and is also connected to the mobile communication network 110 either directly or indirectly through the transaction processing facilitator.

The memory 210 may include both volatile (RAM) and non-volatile (ROM) memory units and may also include hard disk and backup storage capacity. The memory 210 stores software programs in a program storage portion 212 and stores data in a data storage portion 214. The program storage portion 212 includes the provisioning module 124, which in some embodiments also includes an installation module 216. As will be explained in detail with reference to FIG. 3, the provisioning module 124 includes software instructions for monitoring for incoming authorization requests for financial transactions performed by a flagged FTD whose holder has requested enablement of his her mobile communication device as an FTD. Upon receipt of such a request, the provisioning module 124 sends a security key and FTD data to the mobile communication device for enablement. Accordingly, FTD identifiers 220, mobile communication device identifiers 222, security keys 122 (shown in FIG. 1) and FTD data 224 are stored in data storage 214 in order to carry out the operations of the provisioning module 214.

The data structure of the FPD identifier 220 and mobile communication device identifier 222 is such that given an FPD identifier, the associated mobile communication device identifier 222 can be retrieved, and vice versa. Software program modules in the program storage 212 and data from the data storage portion 214 are transferred from memory on as-needed basis as directed by the processor 204.

It is to be appreciated that the computer 200 can be any computer such as a personal computer, minicomputer, workstation, mainframe, or a combination thereof. While the computer 200 is shown, for illustration purposes, as a single computer unit, the system may comprise a group/farm of computers which can be scaled depending on the processing load and database size.

Figure 3:
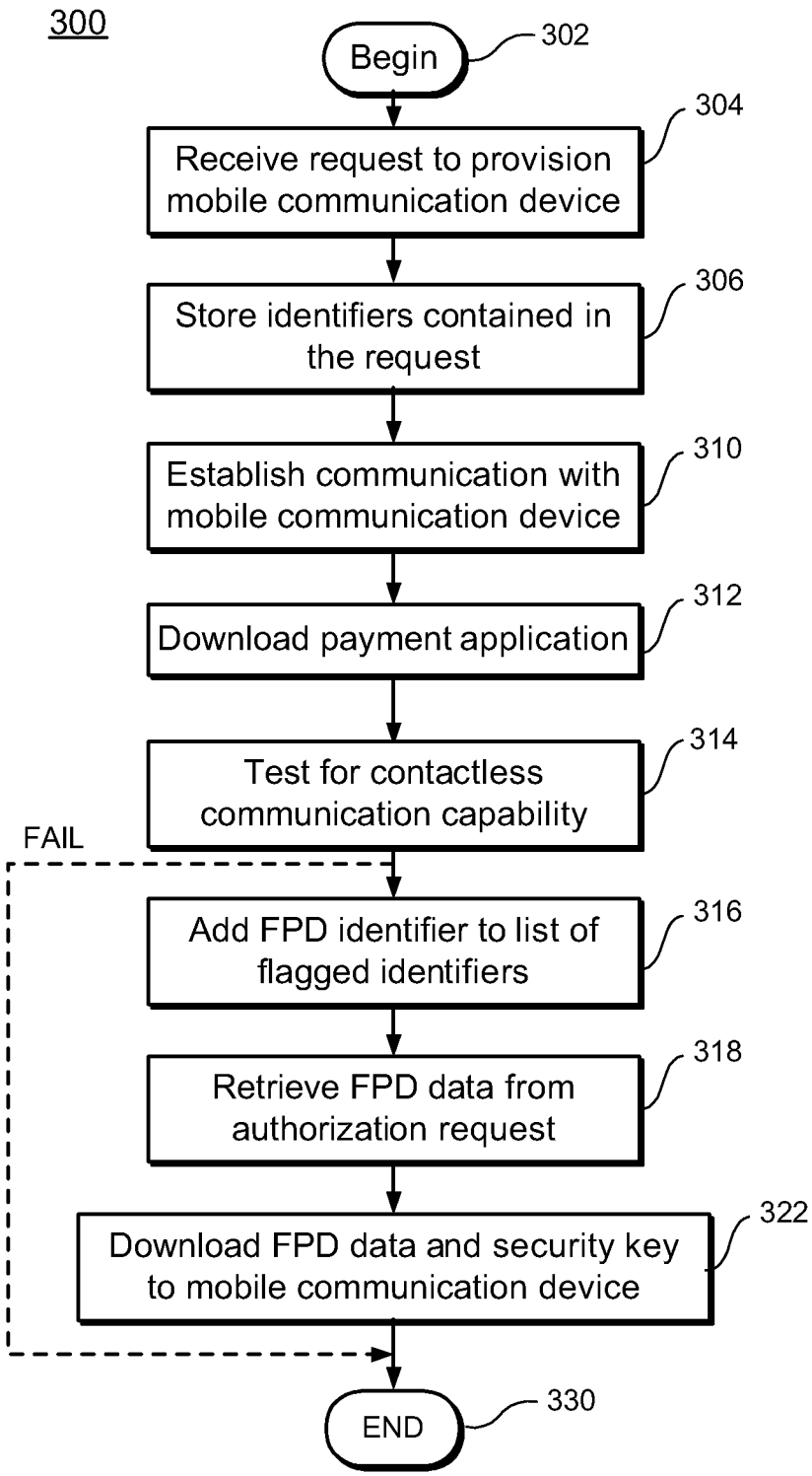
FIG. 3 is a flow chart of a method of enabling a mobile communication device as a financial presentation device (FPD) according to an embodiment of the present invention.

FIG. 3 is a flow chart of a method 300 of enabling a mobile communication device to operate as an FPD according to an embodiment of the present invention. In step 302, the method begins. In step 304, transaction processing facilitator 112 receives a request from a holder of an FTD to enable his or her mobile communication device 102 to operate as the same FTD. For example, if the holder has a Visa credit card having a certain account number, the holder in this case requests that his or her mobile communication device be adapted so as to operate as a Visa credit card having the same account number.

The request is generally received by the issuer 120 who then redirects it to transaction processing facilitator 112 in the form of an electronic message by the issuer 120 computer although it can be sent from the holder directly to transaction processing facilitator 112 either by telephone or through a website maintained by the issuer or processing facilitator 112. The request message includes an identifier of the FTD (e.g., account number) 220 and also an identifier 222 of mobile communication device 102, preferably a cell phone number. In step 306, transaction processing facilitator 112 stores the FTD identifier 220 and the mobile communication device identifier 222 in data storage 214 and 'flags' the FTD of the requesting holder for monitoring. The flagged accounts can be maintained as a list in the data storage 214.

In step 310, installation module 216 establishes wireless communication with mobile communication device 102 over wireless communication network 110 using mobile communication device identifier 222.

Once communication is established, in step 312, download of the payment application into either the secured memory element 106 or unsecured memory element 105 commences. If the download is to the secure memory element 106, permission to access such secure element would have to be pre-approved by the particular service provider of the mobile communication and may involve use of an encryption key provided by the service provider.

The payment application includes software that enables the mobile communication device to perform financial transactions using near-field payment data transfer at a point of sale using ISO 14443, Bluetooth™ or a similar near-field communication protocol. The payment application may also allow financial transactions to take place over the mobile communication network 110. In some embodiments, in step 312, the FTD holder may acquire the payment application from another source, such as the issuer of the FTD. It is noted that, by itself, the payment application does not complete the enablement of mobile communication device 102 as an FTD; rather, completion occurs after FPD-specific data has been provided to mobile communication device 102 as discussed further below.

In some embodiments, in step 314, during the download process, a sub-routine of the payment application performs a diagnostic test to determine whether the mobile communication device supports contactless communications such as near-field communications. If it does not, the method ends in step 330. If the mobile communication device does support near-field communications (and can thus function as an FPD), control of passes to step 316.

After the payment application has been downloaded, the provisioning module 124 in step 316 adds the FTD identifier 220 to the list of flagged identifiers for monitoring. Specifically, the module 124 begins to monitor authorization requests received over the financial service network for the added FTD identifier. This would occur, for example, if the FTD holder uses a conventional FTD such as a physical credit card to purchase an item at a merchant 116. When the card is swiped, the merchant's computer 116 sends an authorization request containing the card number (FTD identifier), other FTD data and transaction details which is received by the transaction processing facilitator 112 as part of the normal transaction authorization process. The provisioning module 124 makes a match between the added FTD identifier and the FTD identifier contained in the authorization request message.

When the match is made, the provisioning module 124 retrieves FPD data 224 contained in the authorization request message. The FPD data includes such information as the FPD account number, the holder name, expiration data, a service code, PIN verification data, and card verification values. In step 320, provisioning module 124 establishes a secure communication with mobile communication device 102 over wireless communication network 110 (using mobile communication device identifier 222) to access the secure memory element 106. As discussed above, permission to access such secure element would have to be pre-approved by the particular service provider of the mobile communication and may involve use of an encryption key provided by the service provider.

Once secure communication is established with the secure element 106, in step 322, provisioning module 124 retrieves the stored master security key 122 for the issuer and derives an individualized security key which is specific to the FPD identifier based on some portions of the FPD data. The module 124 then sends the individualized security key and the retrieved FPD data to mobile communication device 102 along with certain provisioning commands. The provisioning commands direct the mobile communication device to store the security key and FPD in secure memory element 106. By the receipt of the security key and FPD data, mobile communication device is provided with data specific to the FPD, which completes the provisioning process of enabling mobile communication device 102 to operate as an FPD. The method ends in step 330.

The payment application installed on mobile communication device 102 may utilize the stored security key to encrypt data communications during financial transactions. Alternatively, the security key may be used to derive one or more secondary keys via a secure algorithm known by transaction processing facilitator 112, which are then used to encrypt data communications or to derive certain values such as dynamic verification values, providing an added layer of security. In this case, transaction processing facilitator 112 will be able to decrypt the communications using an inverse of the derivation algorithm.

The foregoing specific embodiments represent just some of the ways of practicing the present invention. Many other embodiments are possible within the spirit of the invention.

Accordingly, the scope of the invention is not limited to the foregoing specification, but instead is given by the appended claims along with their full range of equivalents.

What is claimed is:

1. A system for enabling a mobile communication device having a secure memory element to operate as a financial presentation device (FPD) which is presentable to providers of goods or services, the system comprising:
    a memory storing a security key corresponding to an issuer of the FPD, wherein the security key is an encryption key;
    a processor coupled to the memory; and
    a provisioning module executable by the processor and adapted to:
    monitor incoming authorization requests for financial transactions to retrieve an authorization request of a financial transaction that was initiated with the FPD, the authorization request received from a point of sale (POS) terminal through an acquirer, wherein the authorization request comprises FPD data including an FPD identifier associated with the FPD;
    retrieve the FPD data contained in the authorization request;
    store the FPD data contained in the authorization request in the memory; and
    transmit via a wireless communication network the stored security key and the stored FPD data to the mobile communication device for storage into the secure memory element so as to enable the mobile communication device to operate as the FPD.

2. The system of claim 1, wherein the provisioning module is adapted to receive and store an identifier of the mobile communication device by which communication with the communication device through the mobile communication network is established.

3. The system of claim 2, wherein the mobile communication device comprises a cell phone and the identifier of the mobile communication device comprises a cell phone number.

4. The system of claim 3, wherein the FPD comprises a credit card or a debit card.

5. The system of claim 2, wherein the provisioning module is adapted to receive a request to enable the mobile communication device as the FPD, the request including the identifier of the mobile communication device and the FPD identifier.

6. The system of claim 5 wherein the provisioning module is adapted to add the FPD identifier to a list of flagged identifiers for monitoring.

7. The system of claim 6 wherein the provisioning module is adapted to make a match between the FPD identifier and an identifier of the FPD in the authorization request of the financial transaction.

8. The system of claim 1, wherein the provisioning module includes an installation module executable by the processor and adapted to transmit a payment application to the mobile communication device for enabling the mobile communication device to operate as the FPD.

9. The system of claim 1, wherein the provisioning module is configured to derive a secondary security key specific for the FPD.

10. The system of claim 1 wherein the FPD data further comprises at least one of the following: a service code, PIN verification data, a card verification value and the financial transaction details.

11. A system for enabling a mobile communication device having a secure memory element to operate as a contactless financial presentation device (FPD) which is presentable to providers of goods or services, the system comprising:
    a transaction processing system that routes authorization requests from merchants to issuers of FPDs for purposes of authorizing FPD transactions;
    a memory storing security keys of FPD issuers, wherein the security keys are encryption keys;
    a processor coupled to the memory and the transaction processing system; and a provisioning module executable by the processor and adapted to:
    monitor the authorization requests being routed by the transaction processing system to retrieve an authorization request that was initiated by a particular FPD, the authorization request being received from a point of sale (POS) terminal via an acquirer, wherein the authorization request comprises FPD data including an FPD identifier associated with the particular FPD;
    retrieve the FPD data contained in the authorization request;
    store the FPD data contained in the authorization request in the memory; and
    transmit via a wireless communication network a security key associated with the particular FPD and the stored FPD data to the secure memory element of the mobile communication device to enable the mobile communication device to operate as the particular FPD, wherein the security key is an encryption key.

12. The system of claim 11, wherein the provisioning module is adapted to receive a request to enable the mobile communication device as the particular FPD, the request including an identifier of the mobile communication device and the FPD identifier.

13. The system of claim 11, wherein the provisioning module includes an installation module executable by the processor and adapted to transmit a payment application to the mobile communication device for enabling the mobile communication device to operate as the particular FPD.

14. The system of claim 11, wherein the provisioning module is configured to derive a secondary security key specific for the particular FPD.

15. A method for enabling a mobile communication device having a secure memory element to operate as a financial presentation device (FPD) which is presentable to providers of goods or services, the method comprising:
    monitoring, using a processor, authorization requests for financial transactions being routed by a transaction processing system between merchants and issuers of FPDs for purposes of authorizing FPD transactions, the transaction processing system storing security keys of FPD issuers;
    retrieving, using the processor, an authorization request of a financial transaction that was initiated with a particular FPD based on monitoring of the authorization requests, wherein the authorization request is received from a point of sale (POS) terminal via an acquirer, wherein the authorization request comprises an FPD identifier associated with the particular FPD;
    retrieving the FPD data contained in the authorization request;
    storing the FPD data contained in the authorization request in a memory coupled to the processor; and transmitting via a wireless communication network a security key associated with the particular FPD and the stored FPD data to the mobile communication device for storage into the secure memory element so as to enable the mobile communication device to operate as the particular FPD, wherein the security key is an encryption key.

16. The method of claim 15, further comprising:
receiving and storing an identifier of the mobile communication device by which communication with the communication device through the mobile communication network is established.

17. The method of claim 16, wherein:
the mobile communication device comprises a cell phone and the identifier comprises a cell phone number;
the particular FPD comprises a credit card or a debit card; and
the step of transmitting includes transmitting the stored security key and the stored FPD data using the cell phone number.

18. The method of claim 15, further comprising:
receiving a request to enable the mobile communication device as the particular FPD, the request including an identifier of the mobile communication device and the FPD identifier.

19. The method of claim 15, further comprising:
transmitting a payment application to the mobile communication device for enabling the mobile communication device to operate as the particular FPD.

20. The method of claim 15, prior to transmitting the stored security key and the stored FPD data, further comprising:
deriving the security key, which is a secondary security key specific for the particular FPD.

21. The method of claim 15, further comprising, prior to monitoring:
transmitting a payment application to the mobile communication device for enabling the mobile communication device to operate as the particular FPD.

22. The method of claim 21 wherein the authorization request further comprises a holder name.

23. The method of claim 22 wherein the POS terminal is operated by a merchant.

24. The method of claim 15 wherein the security key that is transmitted to the mobile communication device is derived from a stored master key from the issuer of the particular FPD and is based on some portions of the FPD data.

* * * * *